Oct. 28, 1969  D. P. GELLERT  3,474,804
BEACH SHELTER
Filed July 17, 1968  2 Sheets-Sheet 1
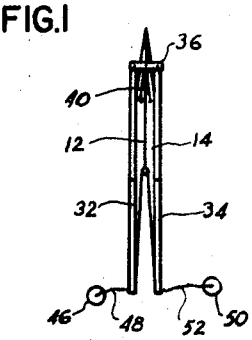
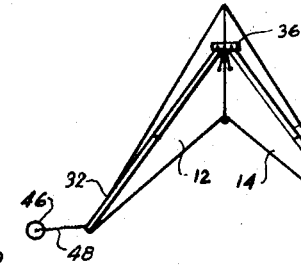
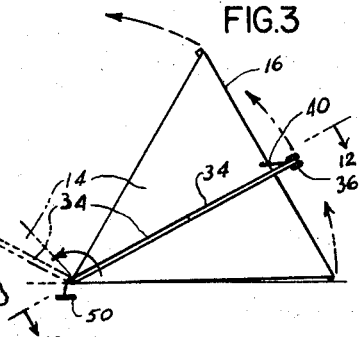
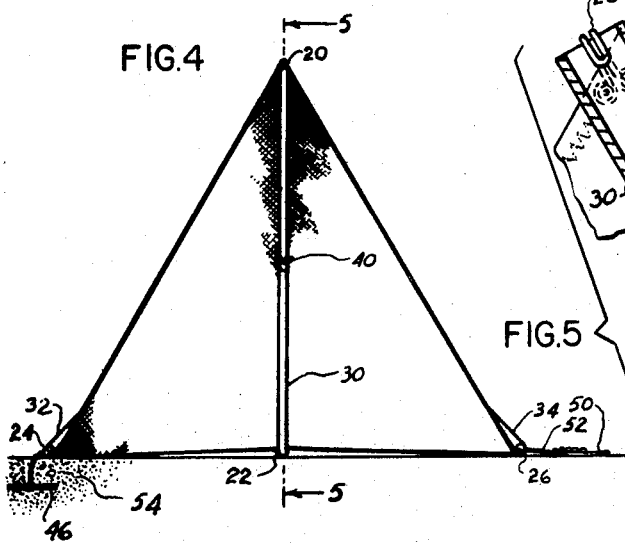
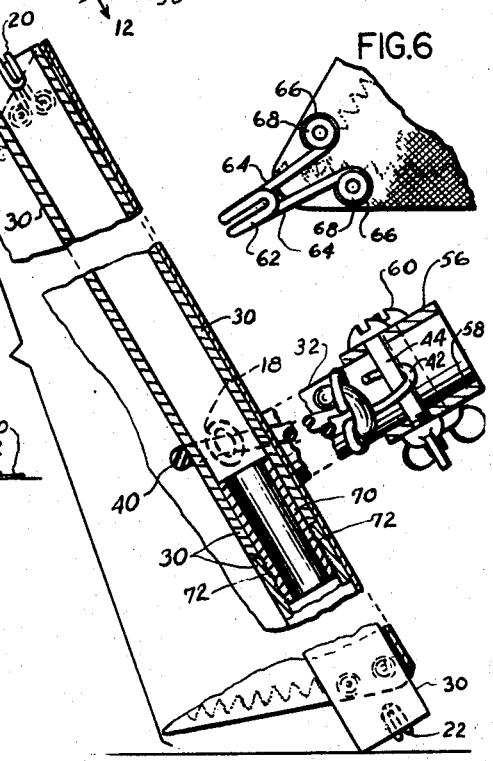
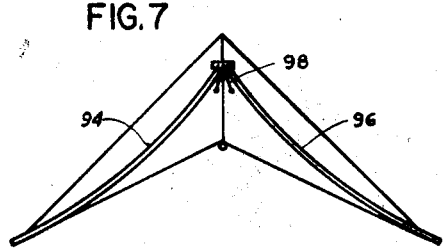
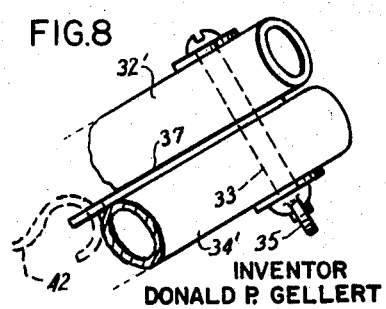
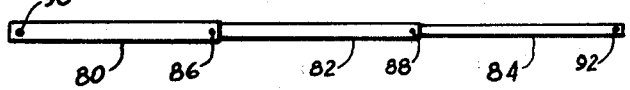
INVENTOR
DONALD P. GELLERT
BY *James and Franklin*
ATTORNEYS

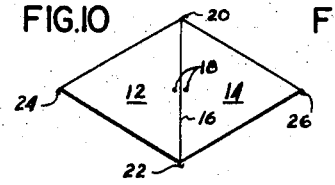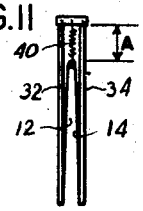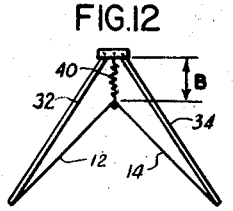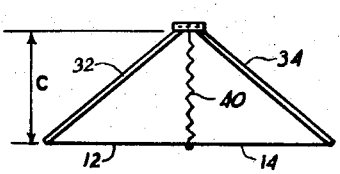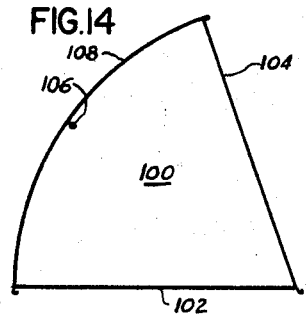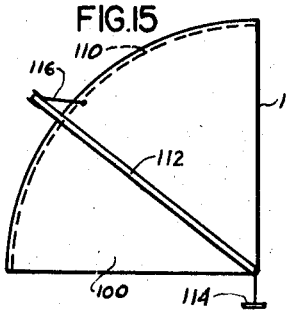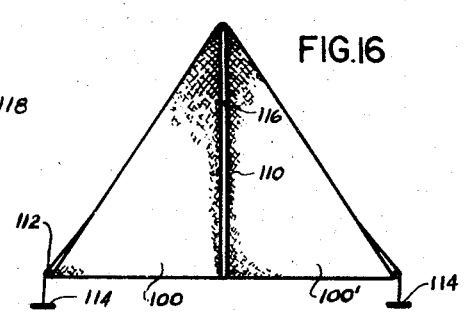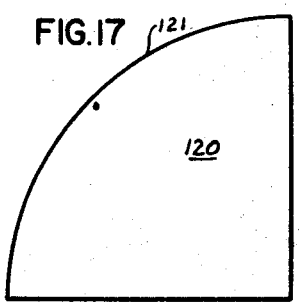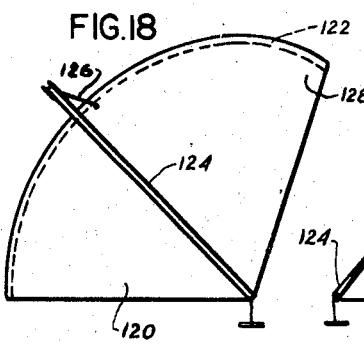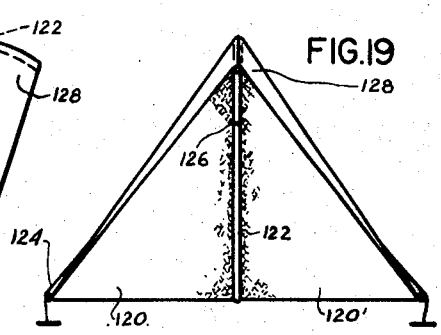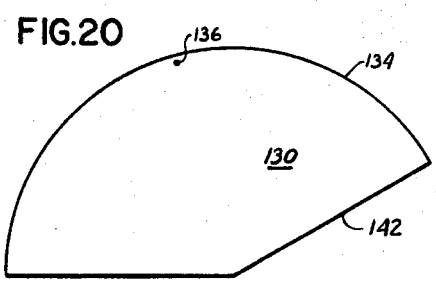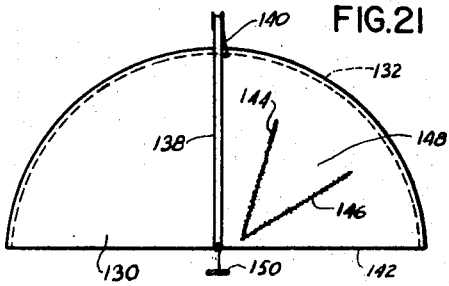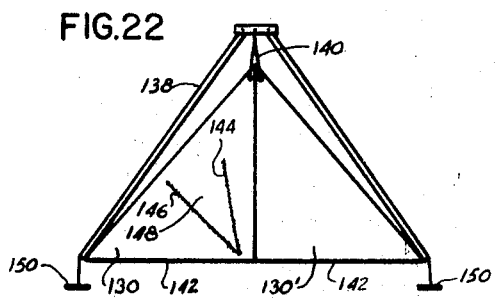

United States Patent Office 3,474,804
Patented Oct. 28, 1969

3,474,804
BEACH SHELTER
Donald P. Gellert, bon Esperance, Charlotte Amalie, St. Thomas, Virgin Islands, assignor to Sunbird Industries, Inc., St. Thomas, Virgin Islands, a corporation of the Virgin Islands
Filed July 17, 1968, Ser. No. 745,541
Int. Cl. E04f *10/02;* A45f *1/16*
U.S. Cl. 135—5                               18 Claims

ABSTRACT OF THE DISCLOSURE

The improved beach shelter comprises two fabric walls each defined by three edges, and joined together along one of said edges. A metal spine is secured along a common edge. A metal compression member is disposed outside each wall, the lower end of said compression member being connected to the free apex of the wall. The two compression members are pivotally connected at their upper ends, and a short elastic tensioning member extends therefrom to the spine at a point approximately midway between the ends of the spine. The lower end of each compression member has a sand anchor. The walls of the beach shelter may be triangles used with a straight spine, or they may be sectors, with the arcuate edges secured together and used with a curved spine.

---

Beach shelters, sometimes called cabanas, are often used as a shelter from wind, sun, or both. Most of these shelters are inconvenient to transport; they do not fold or collapse easily; they are not easy to set up for use; they may be upset and carried away in a high wind; they cannot be left out safely overnight; and the parts may be damaged by shrinkage of the fabric when moist.

The general object of the invention is to provide a beach shelter which overcomes the foregoing difficulties. The improved shelter comprises two fabric walls each defined by three edges, and joined together along one of said edges. The two walls are generally symmetrical about the joined or common edge. A preferably metal spine is secured within the walls along the common edge. A preferably metal compression member is disposed outside each wall, the lower end of said compression member being connected to the free apex or intersection of the two free edges of the wall. The two compression members are pivotally connected to one another at their upper ends, well outside the fabric and spine. A short tensioning member extends from the said upper ends to the spine at a point approximately midway between the ends of the spine.

In usual form the two compression members are rigid, and the tension member is elastically yieldable. This tension member is stretched as the lower ends of the compression members are spread apart when erecting the shelter for use. In preferred form the spine is a pipe, and the ends of the common edge have hooks adapted to be received in the hollow ends of the spine. The compression members also may be metal pipes, and each wall at its free apex then has a hook adapted to be received in the lower end of its compression member. The lower end of each compression member also has a sand anchor, that is, a plate connected by means of a short flexible strand, which plate may be buried in the sand.

The pipes may be in sections which are secured end to end when in use, and which may be stored compactly when not in use. In one form the walls of the beach shelter are triangles, which preferably are equilateral. The spine then may be straight.

In another form each wall approximates a sector of a circle, with the arcuate edges secured together to form the common edge, in which case the spine is curved. By increasing the angular width of the sectors the shelter may be designed to be a closed shelter, rather than an open cabana.

The foregoing and additional features are described in the following detailed specification, which is accompanied by drawings in which:

FIG. 1 is a plan view of a beach shelter which has been assembled but the supports of which have not been spread apart;

FIG. 2 is a similar plan view with the compression supports spread apart;

FIG. 3 is a side elevation of the erected shelter;

FIG. 4 is a front elevation of the same;

FIG. 5 is a fragmentary section drawn to enlarged scale and taken approximately on the line 5—5 of FIG. 4;

FIG. 6 is a fragmentary view drawn to larger scale and showing one of four hooks provided at the corners of the fabric;

FIG. 7 is a plan view like FIG. 2 but showing a modification in which the compression supports are resiliently bendable;

FIG. 8 is a fragmentary view showing the upper ends of compression supports which are pivoted directly together;

FIG. 9 shows telescopic tubing which may be used for either the spine, or supports, or both;

FIG. 10 shows two connected fabric walls which are equilateral triangles;

FIGS. 11, 12 and 13 are explanatory of a feature of the invention;

FIG. 14 shows a sector-shaped side wall;

FIG. 15 is a side elevation of a beach shelter using the side wall of FIG. 14;

FIG. 16 is a front elevation thereof;

FIGS. 17, 18 and 19 similarly respectively show a side wall, a side elevation, and a front elevation of a modification; and FIGS. 20, 21 and 22 respectively show a side wall, a side elevation, and a front elevation of a fully enclosed shelter.

Referring to the drawing, and more particularly to FIG. 10, the shelter comprises side walls 12 and 14 which are equilateral triangles, and which are joined along a common edge 16. The side walls could be a single large wall which is diamond-shaped, by omitting the seam 16. A pair of eyelets 18 are provided at the center for a purpose described later. Each of the four corners has an inwardly directed hook, these hooks being at the top 20, the bottom 22, and at each free apex 24 and 26.

Referring now to FIGS. 4, 5 and 6 of the drawing, the shelter further comprises a spine 30 which extends along the common edge 16 previously referred to. The spine is preferably a hollow pipe. It receives the hook 20 at its upper end, and similarly receives the hook 22 at its lower end, the fabric being stretched and held taut by the spine 30. The hooks 20 and 22 may be offset somewhat from the seam, as shown in FIG. 5, so that the hooks are at the side of the pipe rather than at the folded seam, which would strain the rivets by attempting to bend the base of the hook around the pipe.

Referring now to FIG. 1, compression supports 32 and 34 are disposed outside the walls. They are pivotally connected to one another at their rearward ends by means of a hinge fitting 36. For convenience these are referred to hereinafter as the upper ends of the supports, but by reference to the side elevation shown in FIG. 3, it will be seen that they could equally well be called the rear ends of the supports, because the supports are disposed angularly. The free apex of each side wall is connected to the lower end of its compression member, and in the drawing it will be seen that the hooks (24 and 26 in FIG. 10) engage the lower ends of the supports 32 and 34 respectively, in the same manner that hook 22 (FIG. 5) engages the lower end of the spine 30. This assumes the use of tubular supports.

The supports 32 and 34 are preferably folded together as shown in FIG. 1, until after a tension member 40 is connected. This is a short and preferably elastic member, which extends from the pivotally connected upper ends of compression members 32 and 34, to the spine 30 at a point preferably midway of the length of the spine. In the from here illustrated, the tension member passes through the eyelets 18 previously referred to, and around the spine as shown in FIG. 5.

The outer end of the tension member has a hook 42 (FIG. 5) which may be caught around a suitable screw or bolt 44 forming a part of the hinge assembly 36.

The compression supports 32 and 34 may then be spread apart as shown in FIGS. 2 and 4 to erect the shelter. This increases the tension at the tension member 40.

The reason for this may be explained with reference to FIGS. 11, 12 and 13. These are views taken parallel to the compression supports as shown by the line 12—12 in FIG. 3. In FIG. 11 the supports 32 and 34 are folded together; the side walls 12 and 14 are folded together; and the tension member 40 is in its shortened condition indicated by the letter A. In FIG. 12 the compression supports 32 and 34 have been spread apart, thereby similarly spreading the side walls 12 and 14 apart, and the tension member 40 is stretched to the length B. To better understand this, reference may be made to FIG. 13 in which the compression supports 32 and 34 have been spread apart to a theoretical maximum, so that the walls 12 and 14 cannot be further spread, and at such time the tension member 40 has its maximum length indicated at C. The normal working condition shown at B in FIG. 12 is an intermediate condition in which the tension member 40 has been stretched, but less so than in FIG. 13. It will thus be evident that the assembly is most easily completed while the supports 32 and 34 have not yet been spread apart, as in FIGS. 1 and 11.

Referring now to FIGS. 1–4, the lower end of support 32 preferably has a plate 46 secured thereto by means of a short flexible strand or chain 48. In similar fashion a plate 50 is connected to support 34 by means of a flexible strand 52. The plate and chain may be made of metal, but in such case a corrosion resistant metal such as aluminum, brass, or stainless steel should be used.

Referring to FIG. 4, plate 46 is shown buried in the sand 54, in contrast with plate 50, which has not yet been buried. It will be understood that when the plates are buried they act as sand anchors which hold the shelter in position even in a high wind.

The shelter is stable against a wind blowing toward the closed edge 16 (FIG. 3), because the wind serves to seat the shelter more firmly downward against the beach. The shelter is stable even against a wind coming in an opposite direction, that is, into the shelter. This is so because the area below the compression supports is as large as the area above the supports, and there is accordingly little or no tendency to turn the shelter over. Any such tendency is counteracted by the sand anchors 46 and 50. No sand anchor is needed at the lower end of the spine, and there is a positive advantage in not having such an anchor, because with the arrangement here shown the shelter may be intentionally turned upward and over about the lower ends of supports 32 and 34, as shown by the broken line position of the compression support 34 in FIG. 3, thus readily changing the shelter from a condition obstructing the wind to a condition receiving the wind. This is done without moving the sand anchors.

The particular form of hinge here shown comprises top and bottom metal plates 56 and 58 (FIG. 5). One pivot 60 passes through the plates, with the upper end of support 32 therebetween. Another similar pivot passes through the plates with the upper end of support 34 therebetween. These two pivots are spaced apart, and may employ wing nuts to facilitate assembly. The anchor screw 44 passes through the top and bottom plates between the two spaced pivots, and receives the hook 42 to anchor the rear or outer end of the tension member 40.

However, it is not necessary to employ this particular hinge unit, and in FIG. 8 I show a construction in which the upper ends of supports 32' and 34' are pivoted directly to one another by means of a single bolt 33. Here again a wing nut 35 may be used to facilitate disassembly. The tension member may be hooked on the bolt 33 between the pipes, or it may be hooked on the crossed upper ends of the intersecting pipes, or in any other desired fashion. In the present case a plate 37 is held by bolt 33, and has a second hole at its lower end to receive the hook 42 of the tension member.

One form of hook which may be used at the four corners of the fabric is shown in FIG. 6. It is formed of very heavy wire, and is reversely folded or doubled, and bent to form the hook portion 62. The shank portions 64 are bent to form two eyes 66, and these are secured to the fabric by means of eyelets 68 acting as rivets.

In a particular example the equilateral triangles shown in FIG. 10 are eight feet on a side, and seam 16 and the spine 30 are therefore eight feet long. The compression supports 32 and 34 must be longer than the altitude of the triangles, but need not be eight feet in length. Assuming an altitude of about seven feet the compression supports may be say 7½ feet in length.

These long pipes may be inconvenient to store and carry, and therefore may be made up of come-apart sections. Referring to FIG. 5, the parts of pipe 30 are secured together by means of a short sleeve 70, the lower end of which may be permanently secured to one section, as shown at 72, and the other end of which may receive the other section with a slip fit.

Other provisions for compactness may be made. For example, in FIG. 9 the pipe comprises three telescopic sections 80, 82 and 84 which may be slid one into the other, and which when extended, may be latched in extended relation by any suitable detents, here indicated at 86 and 88. One end has a hole 90 to receive the strand or chain of the sand anchor, and the other end has a hole 92 which acts as part of the pivotal connection of the compression support.

It is not essential that the tension be produced by using an elastic tension member, and in FIG. 7 I show a modification in which compression supports 94 and 96 are resiliently bendable. They tend to straighten and therefore exert tension on the tension member 98, the latter in this case being inelastic. As before, it may pass through spaced eyelets and around the spine at a point intermediate the ends of the spine, and preferably about at the midpoint.

The side walls need not be triangular, and instead, may be a sector of a circle. Such a side wall is shown at 100 in FIG. 14, this having straight edges 102 and 104 disposed at an angle less than 90°, in this case about 70°. The eyelets 106 again are preferably disposed at about the midpoint of the arc 108, which is the common or served edge for two such sides.

With this arrangement the spine 110 (FIG. 15) is arcuate and in this case has a length of about 90°, but is curved on a radius somewhat smaller than that of the side wall 100. There are two compression supports 112 outside the shelter, as before, and these preferably are anchored by sand anchors 114. A tension member 116 extends from the upper or pivoted ends of the supports, to and around the spine 110. The front view is shown in FIG. 16, the shelter being fully open at the front, and having its forward edge 118 (FIG. 15) approximately in a vertical plane. For this purpose the edge 104 (FIG.

14) of the side wall, when flat, must be cut back somewhat, say 20° from the vertical. The two sides are 100 and 100' in FIG. 16.

If greater shelter is wanted the sector may be increased in angle, and this is shown in FIGS. 17, 18 and 19 of the drawing. In FIG. 17 the side wall 120 is a sector of about 90°. The spine 122 (FIG. 18) is an arc greater than 90°, say 110°, but is curved on a smaller radius. It receives tension member 126. When the compression supports 124 are spread apart as shown in FIGS. 18 and 19, the shelter assumes the configuration shown, which has some overhang 128 at the top. The two sides are 120 and 120' in FIG. 19.

This increase may be carried all the way to the condition shown in FIGS. 20–22. In FIG. 20 the side wall 130 is a sector of about 150°. The spine, shown at 132 in FIG. 21, is approximately semicircular in configuration, that is, it extends over an angle of 180°, but on a radius smaller than the radius of the curve 134 in FIG. 20. The eyelets 136 again are located half way, and now move to the top when the compression supports 138 are spread apart as shown in FIGS. 21 and 22. The tension member 140 then pulls upward, and the fabric edges 142 move down to the surface of the beach, thus forming a closed shelter. Access is needed and may be provided by means of zippers 144 and 146, defining an openable closure 148. The usual sand anchors may be employed as shown at 150. The two side walls are shown at 130 and 130' in FIG. 22. The drawing is not to scale, and the radius of the spine must be decreased enough for its length to equal arc 134 in FIG. 20. Similarly, the spine 122 has a length equal to arc 121 in FIG. 17, and spine 110 has a length equal to arc 108 in FIG. 14.

It will be understood that both the spine and the compression supports in FIGS. 15, 18 and 21, may be sectional as previously described, for compact storage and shipment. The spine and the supports are preferably made of aluminum or equivalent lightweight and corrosion resistant metal.

The resilient tension member may be made of rubber, or rubber protectively coated with textile. In theory it may be a metal pull spring, but that would be expensive when using a corrosion proof metal.

It is believed that the construction and method of use of my improved beach shelter, as well as the advantages thereof, will be apparent from the foregoing description. The shelter may be set with its spine into the wind, or it may be faced with its open side into the wind, and can be reversed from one to the other by turning it over on the lower ends of the compression supports, thus leaving the two sand anchors in position. In the event of moisture shrinkage, as when leaving the shelter out over night, the shrinkage is taken up by the yieldable tension member, and thus does not harm. When disposed with the spine into the wind, the wind tends to urge the shelter downward, and so makes it more stable. When the open side faces the wind there is as much wind blowing against the lower half as the upper half and therefore there is little or no tendency to blow over. In the more usual condition with the spine against the wind, the shelter will survive even a hurricane force, because it can yield, there being stretch available at the tension member.

It will be understood that while I have shown and described the beach shelter in several preferred forms, changes may be made without departing from the scope of the invention. In the claims the term "fabric" is not intended to exclude other sheet materials, for example one made of a plastic.

I claim:

1. A beach shelter comprising two fabric walls each defined by three edges and joined together along one of said edges, the walls being generally symmetrical about said joined or common edge, a metal spine secured within the joined walls along the common edge, a compression member outside each wall, the lower end of said compression member being connected to the free apex or intersection of the two free edges of the wall, said compression members being pivotally connected to one another at their upper ends well outside the fabric and spine, and a tension member extending from the pivotally connected upper ends of said compression members to the spine at a point approximately midway of the length of the spine.

2. A beach shelter as defined in claim 1, in which the two compression members are rigid, and in which the tension member is elastically yieldable, said tension member being stretched as the lower ends of the compression members are spread apart when erecting the shelter for use.

3. A beach shelter as defined in claim 2, in which the spine is a metal pipe, and in which the walls at the ends of the joined or common edge have hooks adapted to be received in the hollow ends of the spine.

4. A beach shelter as defined in claim 3, in which the compression members are metal pipes, and in which each wall at its free apex has a hook adapted to be received in the lower end of its compression member.

5. A beach shelter as defined in claim 4, in which the lower end of each compression member has a plate connected thereto by means of a short flexible strand, said plate when buried in the sand acting as a sand anchor.

6. A beach shelter as defined in claim 5, in which the walls are approximately equilateral triangles.

7. A beach shelter as defined in claim 5, in which each wall is a sector of a circle, and in which the arcuate edge is the common joined edge, and in which the spine is curved on a radius smaller than that of the side walls.

8. A beach shelter as defined in claim 5, in which each wall is a sector of a circle having an angular width of about 90°, and in which the arcuate edge is the common joined edge, and in which the spine is curved and corresponds to about 90° of arc curved on a radius smaller than that of the side walls.

9. A beach shelter as defined in claim 5, in which each wall is a sector of a circle having an angular width of about 150°, and in which the spine is an approximate semicircle curved on a radius smaller than that of the walls, whereby the lower edges lie in a plane which is approximately horizontal in order to form a substantially closed shelter, and the compression members lie in a plane which is approximately vertical, one of said walls having an openable closure for entry to or departure from the shelter.

10. A beach shelter as defined in claim 5, in which the spine and compression members each comprise multiple pipe sections which may be secured generally end to end when in use, and which may be collapsed for compactness when not in use.

11. A beach shelter as defined in claim 1, in which the spine is a metal pipe, and in which the walls at the ends of the joined or common edge have hooks adapted to be received in the hollow ends of the spine.

12. A beach shelter as defined in claim 1, in which the compression members are metal pipes, and in which each wall at its free apex has a hook adapted to be received in the lower end of its compression member.

13. A beach shelter as defined in claim 1, in which the lower end of each compression member has a plate connected thereto by means of a short flexible strand, said plate when buried in the sand acting as a sand anchor.

14. A beach shelter as defined in claim 1, in which the walls are approximately equilateral triangles.

15. A beach shelter as defined in claim 1, in which each wall is a sector of a circle, and in which the arcuate edge is the common joined edge, and in which the spine is curved on a radius smaller than that of the side walls.

16. A beach shelter as defined in claim 1, in which each wall is a sector of a circle having an angular width of about 90°, and in which the arcuate edge is the common joined edge, and in which the spine is curved and corresponds to about 90° of arc curved on a radius smaller than that of the side walls.

17. A beach shelter as defined in claim 1, in which each wall is a sector of a circle having an angular width of about 150°, and in which the spine is an approximate semicircle curved on a radius smaller than that of the walls, whereby the lower edges lie in a plane which is approximately horizontal to form a substantially closed shelter, and the compression members lie in a plane which is approximately vertical, one of said walls having an openable closure for entry to or departure from the shelter.

18. A beach shelter as defined in claim 1, in which the spine and compression members each comprise multiple pipe sections which may be secured generally end to end when in use, and which may be collapsed for compactness when not in use.

References Cited

UNITED STATES PATENTS

| | | | |
|---|---|---|---|
| 2,069,479 | 2/1937 | Pluth. | |
| 2,725,887 | 12/1955 | Belfer | 135—5 |
| 2,934,076 | 4/1960 | Fulke | 135—5 |
| 3,174,493 | 3/1965 | Gruenberg | 135—5 |
| 3,394,720 | 7/1968 | Moss | 135—5 |

PETER M. CAUN, Primary Examiner

U.S. Cl. X.R.

135—3, 7.1